2 Sheets--Sheet 1

F. VAN PATTEN.
Machines for Milling Fifth-Wheels of Vehicles.

No. 141,683. Patented August 12, 1873.

Witnesses.
R. T. Campbell.
J. N. Campbell.

Inventor
Fred.K Van Patten
by
Mason Fenwick Lawrence
Attys.

AM. PHOTO-LITHOGRAPHIC CO. N.Y. (OSBORNE'S PROCESS.)

F. VAN PATTEN.
Machines for Milling Fifth-Wheels of Vehicles.
No. 141,683. Patented August 12, 1873.
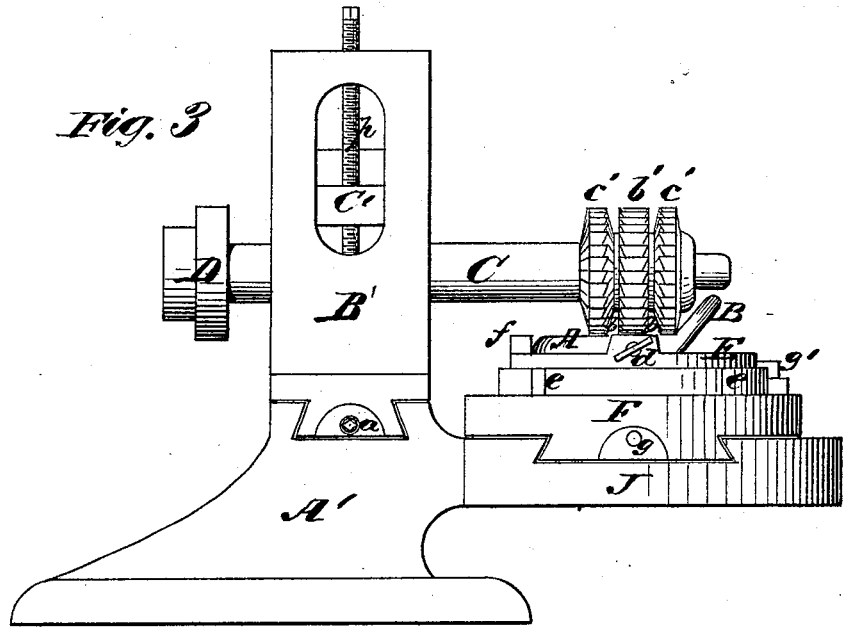
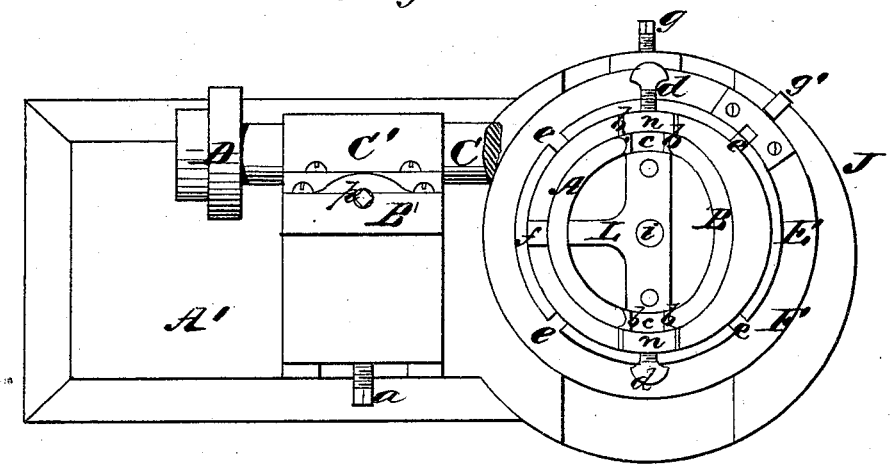

UNITED STATES PATENT OFFICE.

FREDERICK VAN PATTEN, OF AUBURN, NEW YORK, ASSIGNOR, BY MESNE ASSIGNMENTS, TO HIMSELF AND E. D. CLAPP, OF SAME PLACE.

IMPROVEMENT IN MACHINES FOR MILLING FIFTH-WHEELS OF VEHICLES.

Specification forming part of Letters Patent No. 141,683, dated August 12, 1873; application filed March 17, 1873.

*To all whom it may concern:*

Be it known that I, FREDERICK VAN PATTEN, of Auburn, in the county of Cayuga and State of New York, have invented a Mode of Truing the Fifth-Wheel of Vehicles; and I do hereby declare that the following is a full, clear, and exact description thereof, reference being had to the accompanying drawings making part of this specification, in which—

Figure 1:
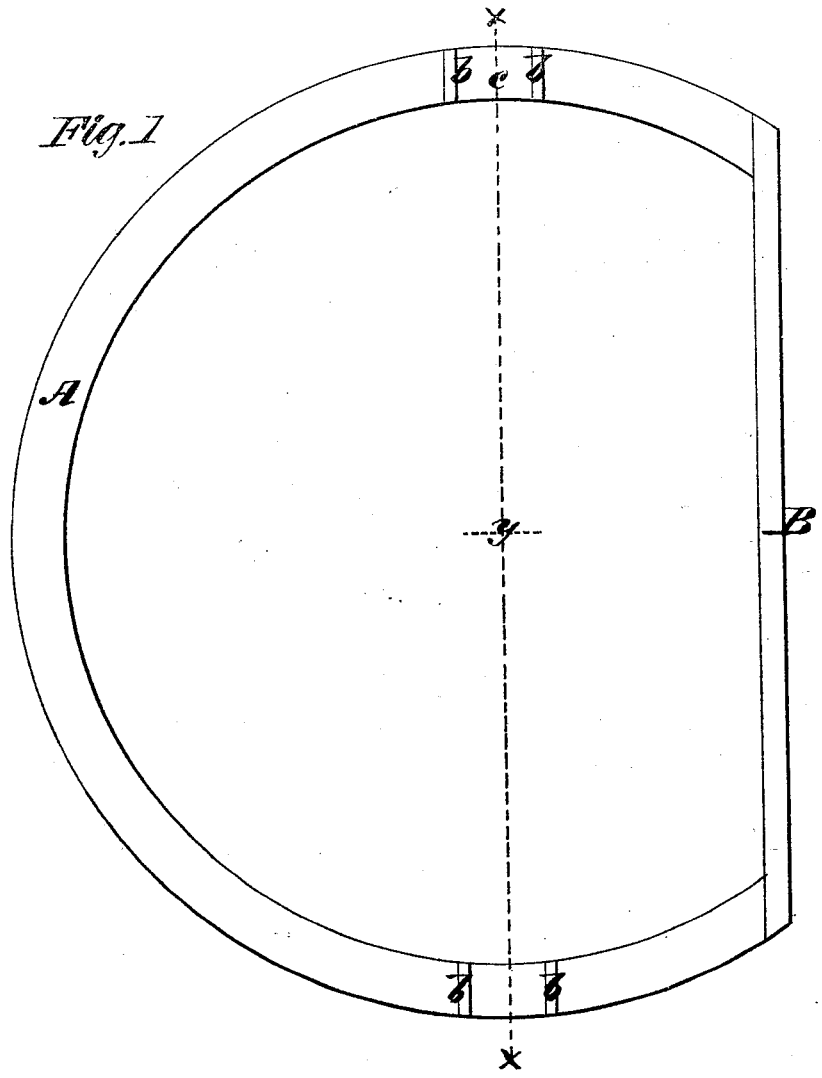
Figure 2:
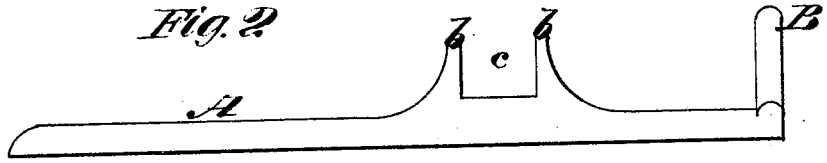

Figure 1, Plate 1, represents a top view of a fifth-wheel. Fig. 2, Plate 1, is a view of one side of the fifth-wheel. Figs. 3 and 4 represent the machine for milling or truing the wheels.

Similar letters of reference indicate corresponding parts in the several figures.

The object of this invention is to mill out the flanges of fifth-wheels by machinery, hereinafter explained, so as to leave these flanges perfectly true with respect to each other and the center of the wheels.

Prior to my invention the practice has been to file out the recesses between the flanges of fifth-wheels by means of hand-files; but the most experienced workmen cannot produce perfectly true work, owing to there being nothing but the eye to guide them in the filing operation.

The following description of my invention will enable others skilled in the art to fully understand it.

In the accompanying drawings, Plate 1, A represents the top fifth-wheel of a vehicle; $b$ $b$, the flanges thereof, and $c$ $c$ the recesses for such flanges. The ends of this wheel A are, in the present instance, connected together by means of an arched cross-bar, B. The wheel A should be perfectly true and concentric to the point $y$, which point should exactly coincide with the axis of the king-bolt where the wheel is applied to the running-gear of a vehicle. The inner surfaces of flanges $b$ $b$ on each side of the wheel should be exactly equidistant from a diametrical line, $x$ $x$, and the recesses $c$ $c$ should be exactly in line. When all these conditions are complied with the wheel can be accurately and conveniently fitted to a vehicle. To accomplish this result I employ a milling-machine, represented on Plate 2. A′ represents the bed of the machine, on one side of which is formed a circular horizontal shelf, J. In the upper surface of the bed A′ a dovetail groove is formed, which receives a dovetail tenon on the base-piece of a vertical standard, B′, as shown in Fig. 3, which, with its base-piece, is adjustable by means of a screw, $a$. The standard B′ has a long bearing, C′, applied to it for a shaft, C, on which is applied milling-wheels $b'$ $c'$ $c'$, and also belt-wheels D. The bearing C′ is so applied to its standard that it can be adjusted vertically by means of a screw, $p$. The shelf J has a dovetail groove formed into its upper surface, which receives into it a corresponding tenon formed on the bottom of a circular carriage, F, which latter is adjustable by means of a screw, $g$. On top of the carriage, and connected to it by a central pivot, $i$, is a circularly-adjustable wheel-rest or chuck, E, on which the wheel A to be milled is centered and confined. This is done by means of a fixed T-shaped piece, L, which affords three internal supports to the wheel A, as shown in Fig. 4, by breaking away a portion of the shaft C. Outside of the wheel A there are three lugs or supports, $n$, $n$, and $f$, and through the two lettered $n$ $n$ clamp-screws $d$ $d$ are tapped, which, when set up, will confine the wheel A rigidly in its place.

The wheel-rest E is confined in its place against circular movement by means of a latch, $g'$, the nose of which enters one of several notches made into the periphery of this rest E, as shown in Fig. 1.

It will be seen from the above description that a wheel to be milled is centered on the rest E with respect to the axis thereof, and rigidly secured in such position. The rotary milling-cutters $c'$ $b'$ $c'$ are then adjusted down so as to mill and finish the recesses $c$, and the outer sides of the flanges $b$ $b$, when the wheel is moved beneath them by means of the screw $g$. The central milling-wheel $b'$ dresses and trues the inner sides of the flanges $b$ $b$ and bottom of the recess $c$, and this wheel may be used without the two wheels $c'$ $c'$, if it is not desired to dress the outer sides of the flanges. By means of washers between the wheels $b'$ and $c'$ these wheels are spaced according to thickness of the flanges $b$ $b$. A vertical plane passing through the wheel $b'$ at the middle of its width should intersect the axis $i$ of the wheel A when the latter is confined on its rest. The path of this wheel $b'$ will then be in a line diametrically across the wheel A, and will mill out the recesses $c\ c$ perfectly true, as represented in Fig. 1.

The bottom fifth-wheels are milled and trued in the same way, and by the same machine which I have above described.

Having described my invention, what I claim as new, and desire to secure by Letters Patent, is—

1. The adjustable wheel-rest E, provided with internal supports and external supports and a central pivot, which latter coincides with the axis of the wheel when confined in place, in combination with a movable carriage, F, and a milling-wheel, $b'$, substantially as and for the purposes described.

2. The combination, with the fifth-wheel rest E, carriage F, and milling-tool $b'$, of the milling-tools $c'$, substantially as described.

FREDERICK VAN PATTEN.

Witnesses:
HORACE T. COOK,
C. M. FITCH.